(12) United States Patent
Iwakoshi et al.

(10) Patent No.: US 12,056,124 B2
(45) Date of Patent: Aug. 6, 2024

(54) DATABASE SYSTEM, DISTRIBUTED PROCESSING APPARATUS, DATABASE APPARATUS, DISTRIBUTED PROCESSING METHOD AND DISTRIBUTED PROCESSING PROGRAM

(71) Applicant: Nippon Telegraph and Telephone Corporation, Tokyo (JP)

(72) Inventors: Sayaka Iwakoshi, Musashino (JP); Seiichiro Mochida, Musashino (JP); Naoto Yamamoto, Musashino (JP); Shinji Kakimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 225 days.

(21) Appl. No.: 17/638,637

(22) PCT Filed: Aug. 29, 2019

(86) PCT No.: PCT/JP2019/033914
§ 371 (c)(1),
(2) Date: Feb. 25, 2022

(87) PCT Pub. No.: WO2021/038795
PCT Pub. Date: Mar. 4, 2021

(65) Prior Publication Data
US 2022/0300509 A1 Sep. 22, 2022

(51) Int. Cl.
*G06F 16/2453* (2019.01)
(52) U.S. Cl.
CPC .............................. *G06F 16/24542* (2019.01)
(58) Field of Classification Search
CPC ............................................... G06F 16/24542
See application file for complete search history.

(56) References Cited

U.S. PATENT DOCUMENTS

2015/0234895 A1* 8/2015 Erdogan ............. G06F 16/2471
707/718
2018/0357444 A1* 12/2018 Kammath ........... G06F 21/6227

FOREIGN PATENT DOCUMENTS

WO WO 2017/138062 8/2017

OTHER PUBLICATIONS

[No Author Listed], "Standard for DB selection, Adopting PostgreSQL based on requirements," PGECons, PostgreSQL Enterprise Consortium, 2016, 44 pages (No Translation).

* cited by examiner

*Primary Examiner* — Van H Oberly
(74) *Attorney, Agent, or Firm* — Fish & Richardson P.C.

(57) ABSTRACT

A distributed processing apparatus 1 includes: a selection unit 12 that lists execution plans for a query related to a plurality of database apparatuses 2 and selects any of the execution plans based on data transfer time periods of the individual execution plans; a transmission unit 13 that divides the query in accordance with the selected execution plan, and transmits instructions that include divided queries obtained by dividing the query and transfer destinations of execution results of the divided queries to the corresponding database apparatuses 2; and an output unit 14 that receives the execution result of the query from the database apparatus 2, and outputs the execution result. The database apparatuses 2 each include an execution unit 22 that executes the divided query included in the instruction received from the distributed processing apparatus 1, and transmits the execution result to another database apparatus 2 or the distributed processing apparatus 1 serving as the transfer destination included in the instruction.

5 Claims, 19 Drawing Sheets

```
> select CM. uid, T. CLASSIFICATION, T. AMOUNT from CM,
                (select * from TTM1) union (select * from TTM2) as T
   where
      CM.uid = T.uid and
T. CLASSIFICATION in ("CLOTHES", "SHOES", "ESTHETIC BEAUTY SALON")
```

Fig. 11

|  | A | B | C |  |
|---|---|---|---|---|
| EXECUTION PLAN 1 | T2⇒T1 | T1⇒K | K⇒C | TOTAL TRANSFER TIME PERIOD (s) |
| THE NUMBER OF TRANSFER RECORDS (LINES) | 5,000 | 20,000 | 20,000 | — |
| TRANSFER RATE (Mbps) | 3 | 10 | 5 | — |
| TRANSFER TIME PERIOD (s) | 13.33 | 16.00 | 32.00 | 61.33 ⇐ MINIMUM COST |

| EXECUTION PLAN 2 | T2⇒K | K⇒T1 | T1⇒C | TOTAL TRANSFER TIME PERIOD (s) |
|---|---|---|---|---|
| THE NUMBER OF TRANSFER RECORDS (LINES) | 5,000 | 20,000 | 20,000 | — |
| TRANSFER RATE (Mbps) | 10 | 10 | 1 | — |
| TRANSFER TIME PERIOD (s) | 4.00 | 16.00 | 160.00 | 180.00 |

| EXECUTION PLAN 3 | T1⇒T2 | T2⇒K | K⇒C | TOTAL TRANSFER TIME PERIOD (s) |
|---|---|---|---|---|
| THE NUMBER OF TRANSFER RECORDS (LINES) | 15,000 | 20,000 | 20,000 | — |
| TRANSFER RATE (Mbps) | 3 | 10 | 5 | — |
| TRANSFER TIME PERIOD (s) | 40.00 | 16.00 | 32.00 | 88.00 |

| EXECUTION PLAN 4 | T1⇒K | K⇒T2 | T2⇒C | TOTAL TRANSFER TIME PERIOD (s) |
|---|---|---|---|---|
| THE NUMBER OF TRANSFER RECORDS (LINES) | 15,000 | 20,000 | 20,000 | — |
| TRANSFER RATE (Mbps) | 10 | 10 | 1 | — |
| TRANSFER TIME PERIOD (s) | 12.00 | 16.00 | 16.00 | 188.00 |

| EXECUTION PLAN 5 | K⇒T1 | T1⇒T2 | T2⇒C | TOTAL TRANSFER TIME PERIOD (s) |
|---|---|---|---|---|
| THE NUMBER OF TRANSFER RECORDS (LINES) | 6,000,000 | 20,000 | 20,000 | — |
| TRANSFER RATE (Mbps) | 10 | 3 | 1 | — |
| TRANSFER TIME PERIOD (s) | 4800.00 | 53.33 | 160.00 | 5013.33 |

| EXECUTION PLAN 6 | K⇒T2 | T2⇒T1 | T1⇒C | TOTAL TRANSFER TIME PERIOD (s) |
|---|---|---|---|---|
| THE NUMBER OF TRANSFER RECORDS (LINES) | 6,000,000 | 20,000 | 20,000 | — |
| TRANSFER RATE (Mbps) | 3 | 3 | 1 | — |
| TRANSFER TIME PERIOD (s) | 4800.00 | 53.33 | 160.00 | 5013.33 |

* 1 RECORD = 1 kB = 8 kbit

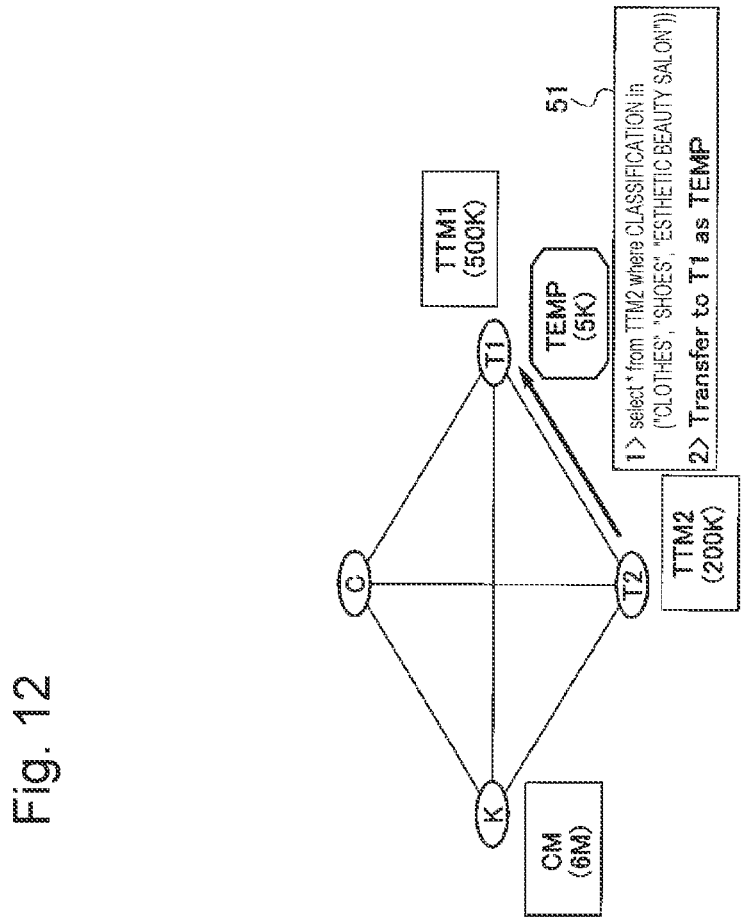
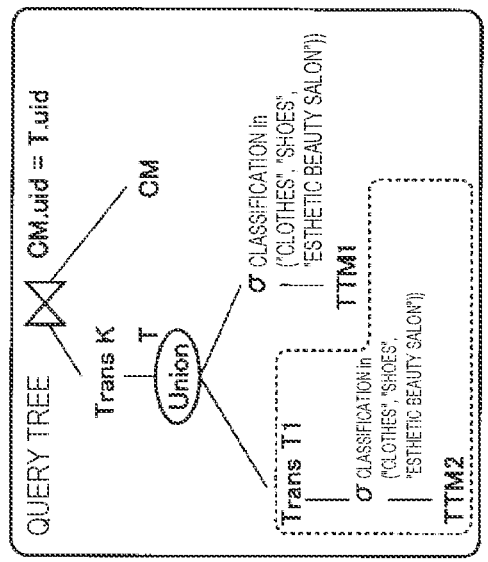
Fig. 12

DATABASE SYSTEM, DISTRIBUTED PROCESSING APPARATUS, DATABASE APPARATUS, DISTRIBUTED PROCESSING METHOD AND DISTRIBUTED PROCESSING PROGRAM

CROSS-REFERENCE TO RELATED APPLICATIONS

This application is a National Stage application under 35 U.S.C. § 371 of International Application No. PCT/JP2019/033914, having an International Filing Date of Aug. 29, 2019. The disclosure of the prior application is considered part of the disclosure of this application, and is incorporated in its entirety into this application.

TECHNICAL FIELD

The present invention relates to a database system, a distributed processing apparatus, a database apparatus, a distributed processing method and a distributed processing program.

BACKGROUND ART

As a technique of processing a query across databases distributed via a network, a method of virtually integrating external databases has been known (Non-Patent Literature 1).

According to Non-Patent Literature 1, data items in the databases distributed via the network are integrated into a single server, and then the query is processed.

CITATION LIST

Non-Patent Literature

Non-Patent Literature 1: "Standard for DB selection, Adopting PostgreSQL based on requirements", PostgreSQL Enterprise Consortium, Technical Section, WG #2, P 28-30, [Online], Internet <URL:https://www.pgecons.org/wp-content/uploads/PGECons/2015/WG2/14_ReferenceForDatabaseSelection.pdf>

SUMMARY OF THE INVENTION

Technical Problem

In the case of integrating the data items in the databases distributed via the network into the single server and then processing queries, the transfer data amount is large, and data transfer requires a certain time period. In the case of transferring a large amount of data, a high transfer cost is caused.

The present invention has been made in view of the situations described above, and has an object to provide a technique of processing a query related to a plurality of databases without aggregating, into a single apparatus, data items in the databases via a network.

Means for Solving the Problem

To achieve the object described above, an aspect of the present invention proves a database system including: a distributed processing apparatus; and a plurality of database apparatuses. In the database system, the distributed processing apparatus includes: a selection unit that lists execution plans for a query related to the database apparatuses, and selects any of the execution plans, based on data transfer time periods of the individual execution plans; a transmission unit that divides the query in accordance with the selected execution plan, and transmits, to the corresponding database apparatuses, instructions that include divided queries obtained by dividing the query, and transfer destinations of execution results of the divided queries; and an output unit that receives the execution result of the query from the database apparatus, and outputs the execution result. In the database system, the database apparatuses each include an execution unit that executes the divided query included in the instruction received from the distributed processing apparatus, and transmits the execution result to another database apparatus or the distributed processing apparatus serving as the transfer destination included in the instruction.

A distributed processing apparatus of an aspect of the present invention includes: a selection unit that lists execution plans for a query related to a plurality of database apparatuses, and selects any of the execution plans based on data transfer time periods of the individual execution plans; a transmission unit that divides the query in accordance with the selected execution plan, and transmits, to the corresponding database apparatuses, instructions that include divided queries obtained by dividing the query, and transfer destinations of execution results of the divided queries; and an output unit that receives the execution result of the query from the database apparatus, and outputs the execution result.

A database apparatus of an aspect of the present invention includes: an execution unit that receives, from a distributed processing apparatus, an instruction that includes a divided query obtained by dividing a query related to the database apparatus and another database apparatus in accordance with an execution plan for the query, and a transfer destination of an execution result of the divided query, executes the divided query, and transmits the execution result to another database apparatus or the distributed processing apparatus serving as the transfer destination; and a measurement unit that measures a network performance between the database apparatus itself and the other database apparatus or the distributed processing apparatus, and transmits the measured performance information to the distributed processing apparatus, in which the execution plan is an execution plan that minimizes a total of data transfer time periods of this database apparatus and the other database apparatus, the total having been calculated using the performance information.

An aspect of the present invention provides a distributed processing method performed by a database system that includes a distributed processing apparatus and a plurality of database apparatuses, in which the distributed processing apparatus performs: a selection step of listing execution plans for a query related to the database apparatuses, and selecting any of the execution plans based on data transfer time periods of the individual execution plans; a transmission step of dividing the query in accordance with the selected execution plan, and transmitting, to the corresponding database apparatuses, instructions that include divided queries obtained by dividing the query and transfer destinations of execution results of the divided queries; and an output step of receiving the execution result of the query from the database apparatus, and outputting the execution result, and the database apparatuses each perform an execution step of executing the divided query included in the instruction received from the distributed processing apparatus, and transmitting the execution result to another database apparatus or the distributed processing apparatus serving as the transfer destination included in the instruction.

An aspect of the present invention provides a distributed processing program for causing a computer to function as the distributed processing apparatus described above.

An aspect of the present invention provides a distributed processing program for causing a computer to function as the database apparatus described above.

Effects of the Invention

According to the present invention, a technique can be provided that processes a query related to a plurality of databases without integrating, into a single apparatus, data items in the databases via a network.

BRIEF DESCRIPTION OF DRAWINGS

FIG. 11 shows an example of the execution cost of the execution plan in a case of using transfer time periods.
FIG. 12 schematically shows a process of a node T2 of an execution plan 1.

DESCRIPTION OF EMBODIMENT

Figure 1:
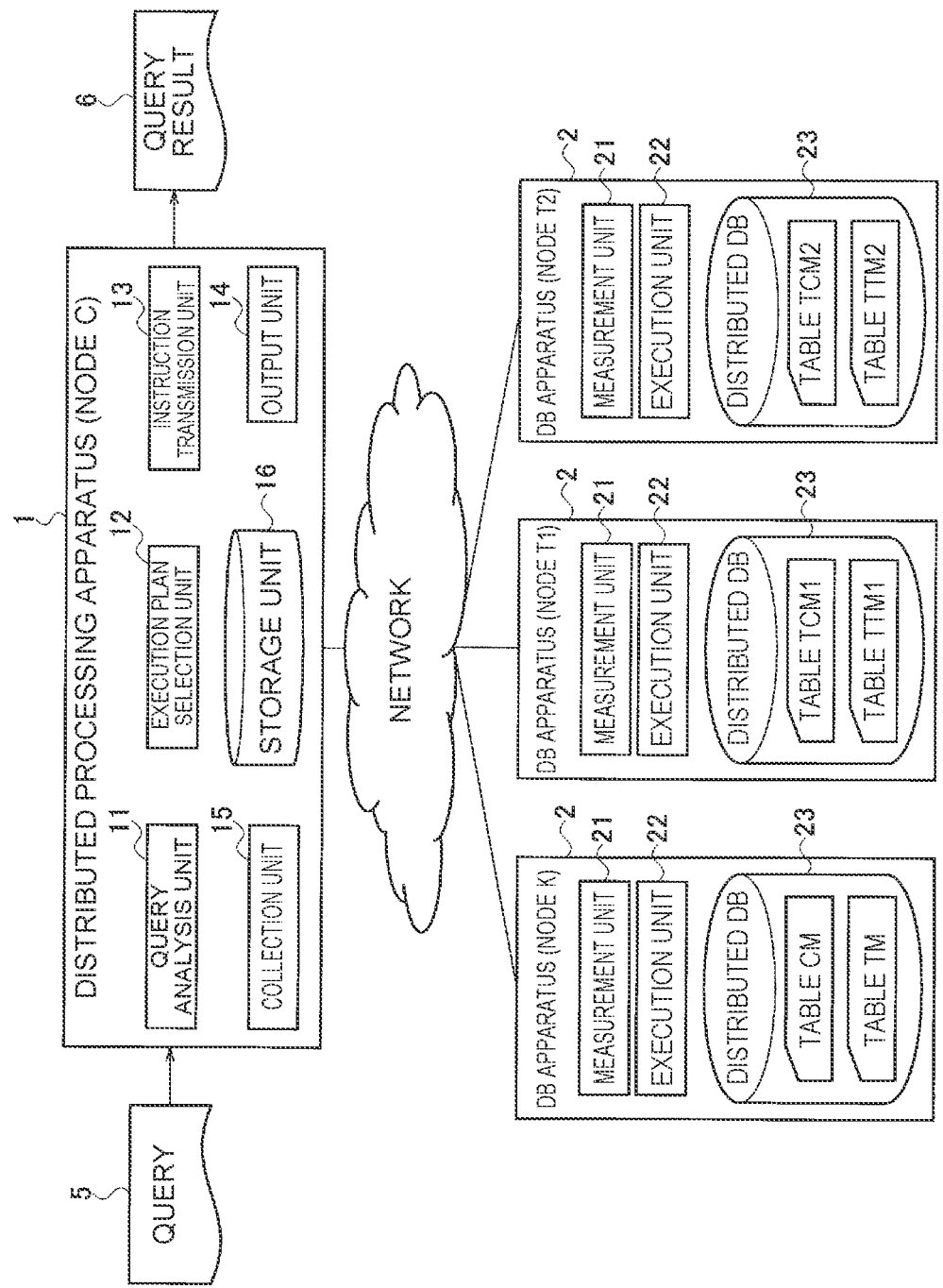
FIG. 1 shows a configuration example of a distributed database system of an embodiment of the present invention.

Hereinafter, an embodiment of the present invention will be described with reference to the drawings. In the description of the drawings, the same components are denoted with the same reference numerals, and the description thereof is omitted.

(Configuration of Distributed DB System)

FIG. 1 shows a configuration example of a distributed DB system (database system) of the present embodiment. The distributed DB system shown in the diagram includes a distributed processing apparatus 1 and a plurality of DB apparatuses 2. The distributed processing apparatus 1 and the DB apparatuses 2 are connected to each other in a manner communicable with other apparatuses via a network. In the shown example, the number of DB apparatuses is three. However, the number of DB apparatuses is not limited to three. It is only required that the number of DB apparatuses 2 is at least two. Note that the distributed processing apparatus 1 and the DB apparatuses 2 are also called "nodes".

The distributed processing apparatus 1 (node C) processes a query across the DB apparatuses distributed via the network in conformity with a network performance. The distributed processing apparatus 1 shown in the diagram includes a query analysis unit 11, an execution plan selection unit 12, an instruction transmission unit 13, an output unit 14, a collection unit 15, and a storage unit 16.

The query analysis unit 11 analyzes an input query 5, and generates a query tree that represents the query 5 in a tree structure. The query 5 of the present embodiment is a query that relates to the plurality of DB apparatuses 2, that is, a query across the DB apparatuses 2.

The execution plan selection unit 12 (selection unit) lists execution plans for the query 5, and selects any of the execution plans based on data transfer time periods of the individual execution plans. Specifically, the execution plan selection unit 12 generates a plurality of execution plans based on the query tree structure, and selects an optimal execution plan from among the execution plans in conformity with the network performance. The selection unit 12 calculates a data transfer time period for each execution plan using network performance information collected from the DB apparatuses 2 and the transfer data amounts of each of the DB apparatuses 2. The execution plan to be selected is, for example, an execution plan that minimizes the total of data transfer time periods of the DB apparatuses 2.

The instruction transmission unit 13 (transmission unit) causes the DB apparatuses 2 to process the query 5 in a distributed manner in accordance with the selected execution plan. Specifically, the instruction transmission unit 13 divides the query 5 in accordance with the selected execution plan, and transmits, to the corresponding DB apparatuses 2, instructions that include divided queries obtained by dividing the query and transfer destinations of execution results of the divided queries.

The output unit 14 receives the final execution result of the query 5 from the DB apparatus 2, and outputs the result as a query result 6. The output unit 14 of the present embodiment receives the execution result of the query 5 from one DB apparatus scheduled last in the selected execution plan. The output unit 14 may visualize the received execution result using a visualization tool, such as Tableau, and output the visualized query result 6.

The collection unit 15 collects network performance information (network bandwidth information and the like) between the DB apparatuses 2 (nodes) from the DB apparatuses 2, and stores the information in the storage unit 16. The storage unit 16 stores the network performance information collected by the collection unit 15.

The DB apparatuses 2 (nodes K, T1, and T2) each include a measurement unit 21, an execution unit 22, and a distributed DB 23. The measurement unit 21 measures network performances between the DB apparatus 2 and the other database apparatuses 2 or the distributed processing apparatus 1, and transmits the measured performance information to the distributed processing apparatus 1. That is, the measurement unit 21 measures the network performances between the nodes.

The execution unit 22 executes the divided query included in the instruction received from the distributed processing apparatus 1, and transmits the execution result to other DB apparatuses 2 or the distributed processing apparatus 1 serving as the transfer destination included in the instruction. The distributed DB 23 stores at least one database.

Figure 2:
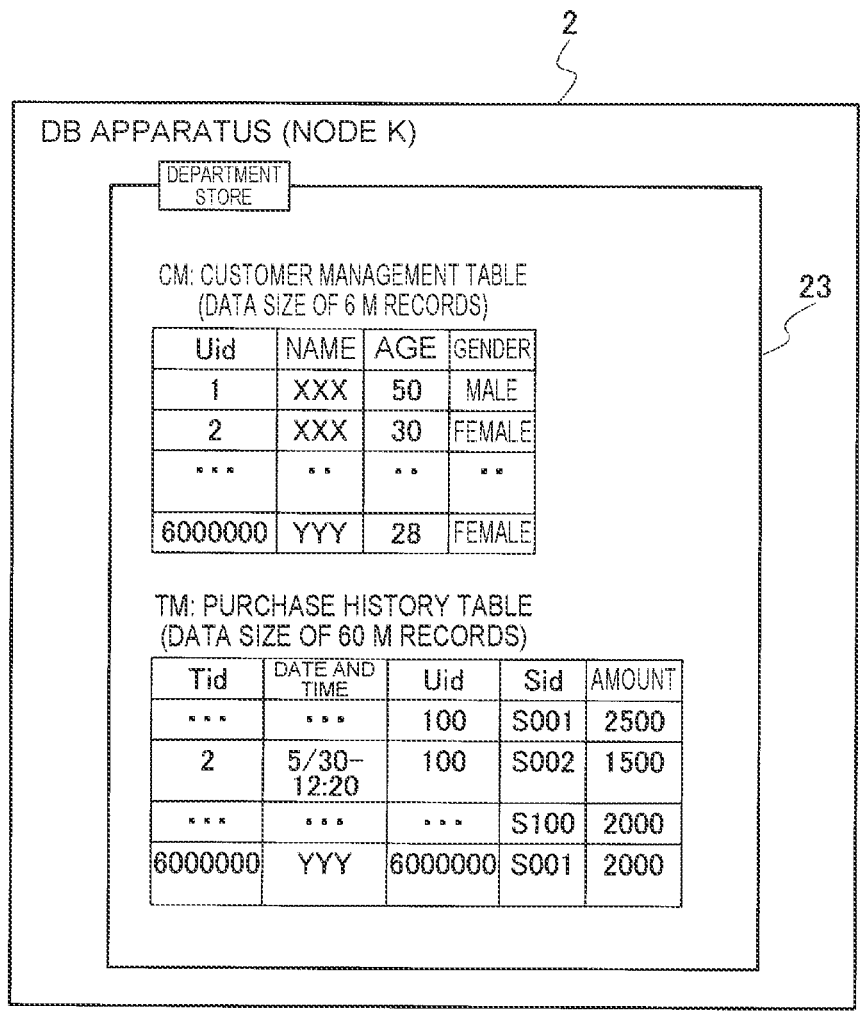
FIG. 2 shows an example of a table stored in a distributed DB of a DB apparatus.
Figure 3:
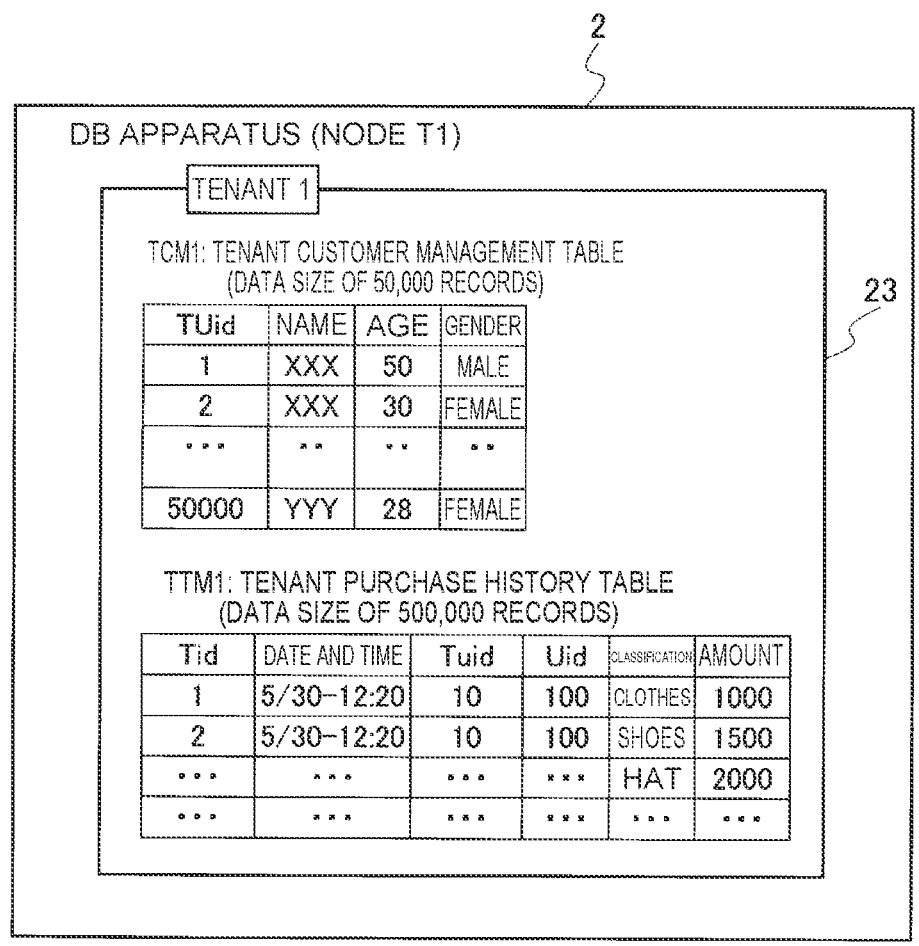
FIG. 3 shows an example of a table stored in a distributed DB of a DB apparatus.
Figure 4:
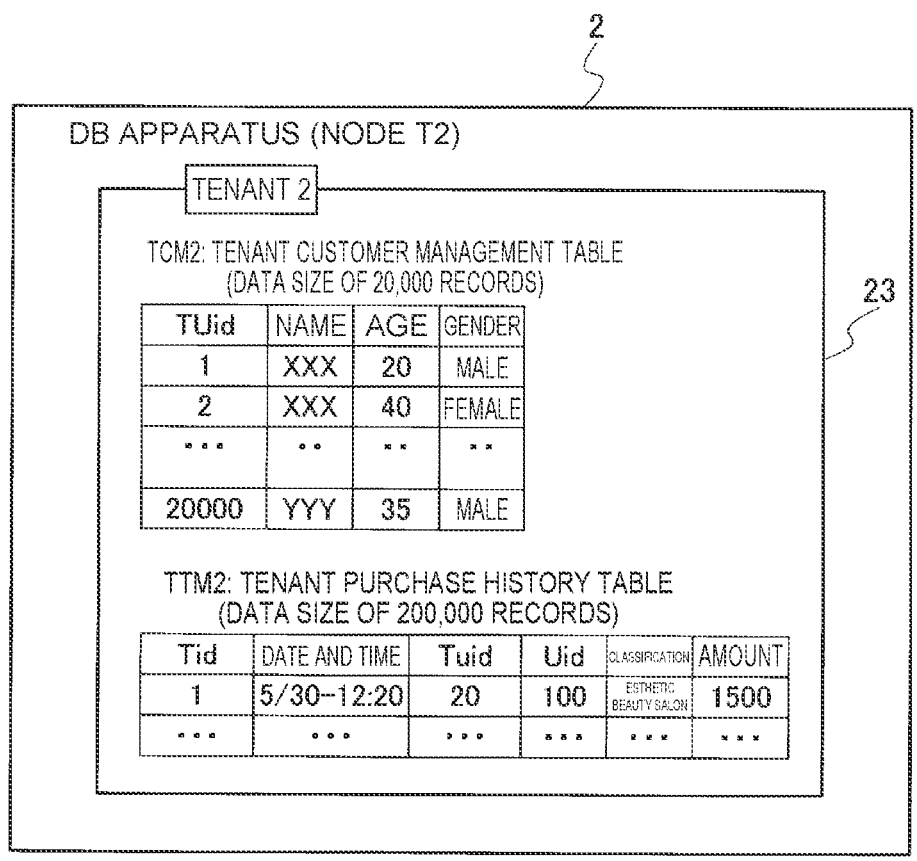
FIG. 4 shows an example of a table stored in a distributed DB of a DB apparatus.

FIGS. 2 to 4 show examples of the tables stored in the individual distributed DBs 23 shown in FIG. 1. FIG. 2 shows the table stored in the distributed DB 23 of the DB apparatus 2 that is the node K. The distributed DB 23 in FIG. 2 is a database of a department store, and includes a CM table (customer management table), and a TM table (purchase history table). The number of records of CM table is 6 M. The number of records of TM table is 60 M.

FIG. 3 shows the table stored in the distributed DB 23 of the DB apparatus 2 that is the node T1. The distributed DB 23 in FIG. 3 is a database of a tenant 1 in the department store, and includes a TCM1 table (customer management table), and a TTM1 table (purchase history table). The number of records of TCM1 table is 50,000. The number of records of TTM1 table is 500,000. The TTM1 table stores user IDs (TUid) of the tenant 1, and user IDs (Uid) in the CM table of the department store, in association with each other.

FIG. 4 shows the table stored in the distributed DB 23 of the DB apparatus 2 that is the node T2. The distributed DB 23 in FIG. 4 is a database of a tenant 2 in the department store, and includes a TCM2 table (customer management table), and a TTM2 table (purchase history table). The number of records of TCM2 table is 20,000. The number of records of TTM2 table is 200,000. The TTM2 table stores user IDs (TUid) of the tenant 2, and user IDs (Uid) in the CM table of the department store, in association with each other.

(Operation of Distributed DB System)

Hereinafter, the operation of the distributed DB system of the present embodiment will be described. Here, a case is described where a query is executed as a query related to the three DB apparatuses 2 shown in FIG. 1, the query being for verifying a hypothesis that there is a high probability that a person going to an esthetic beauty salon purchases clothes or shoes shortly thereafter.

Figure 5:
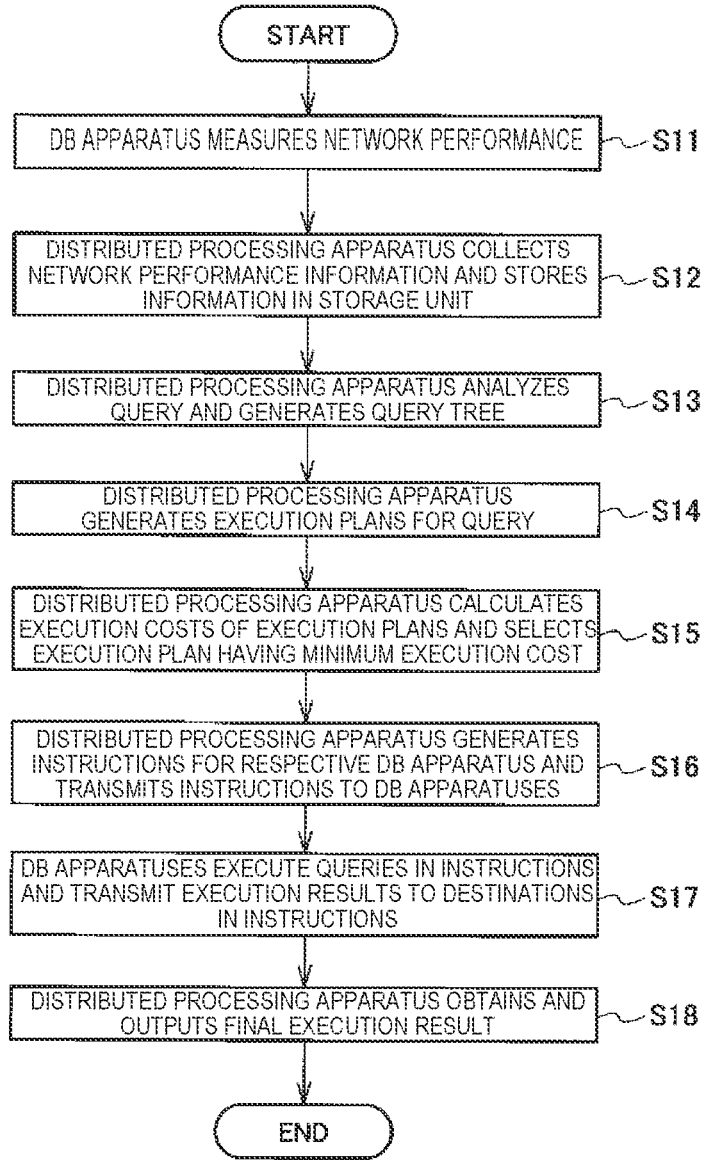
FIG. 5 is a flowchart showing the operation of the distributed database system.

FIG. 5 is a flowchart showing the operation of the distributed DB system of the present embodiment. Each DB apparatus 2 measures network performance(s) between this DB apparatus 2 and other DB apparatus(s) 2 or the distributed processing apparatus 1 (S11). The DB apparatus 2 then transmits the measured network performance information to the distributed processing apparatus 1. Here, the network bandwidth (data transfer rate: bps) is used as the network performance. However, there is no limitation thereto. The distributed processing apparatus 1 collects the network performance information from each DB apparatus 2, and stores the information in the storage unit 16 (S12).

Figure 6:
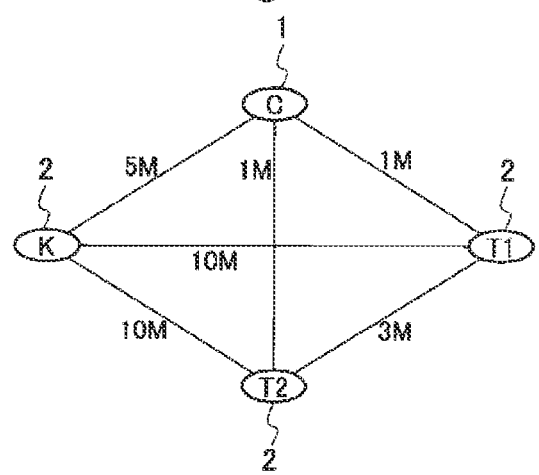
FIG. 6 schematically shows a network performance between apparatuses (nodes).

FIG. 6 schematically shows the network performances between the nodes. In the shown example, for example, the network bandwidth between the nodes K and T1 is 10 Mbps. The network bandwidth between the nodes K and T2 is 10 Mbps. The network bandwidth between the nodes K and C is 5 Mbps.

Note that processes in S11 and S12 are not necessarily performed every time the processes in S13 and thereafter are performed. For example, in a case where the network performance information has already been stored in the storage unit 16, S11 and S12 are not performed, and the distributed processing apparatus 1 may use the network performance information stored in the storage unit 16. Furthermore, S11 and S12 may be performed at predetermined timing, such as periodic timing or timing at an instruction by an operator, to update the network performance information stored in the storage unit 16.

Next, the distributed processing apparatus 1 accepts the query input by the user, analyzes the query, and generates a query tree having a tree structure (S13).

Figures 7, 8:
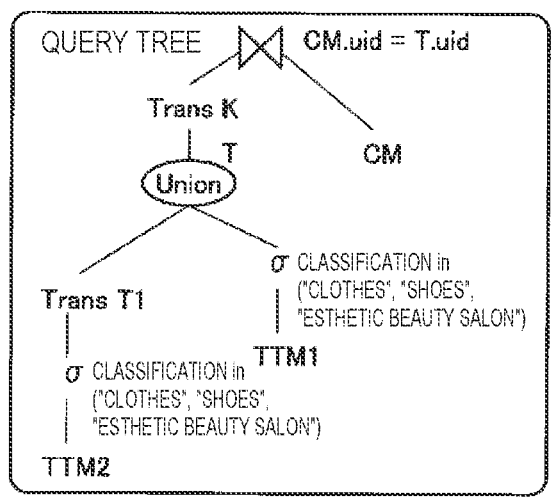
FIG. 7 shows an example of a query.
FIG. 8 shows an example of a query tree.

FIG. 7 is an example of the query related to the plurality of DB apparatuses 2. The query shown in the diagram is a search condition for extracting purchase histories of department store users having purchased goods or services having classifications of "CLOTHES", "SHOES" and "ESTHETIC BEAUTY SALON" in order to verify the hypothesis that there is a high probability that a person going to an esthetic beauty salon purchases clothes or shoes shortly thereafter. Data items intended by the query shown in the diagram are the table CM of the distributed DB (department store) that is the node K, the table TTM1 of the distributed DB (tenant 1) that is the node T1, and the table TTM2 of the distributed DB (tenant 2) that is the node T2 (see FIGS. 2-4).

FIG. 8 is an example of the query tree generated from the query in FIG. 7.

The distributed processing apparatus 1 lists (generates) at least one execution plan that allows an input query to be executed (314). The distributed processing apparatus 1 then calculates the execution cost (execution time period) of each execution plan, and selects the optimal execution plan on the basis of the execution cost (S15). Specifically, the distributed processing apparatus 1 selects any of the execution plans on the basis of the data transfer time periods of the individual execution plans. In the case of the network configuration shown in FIG. 6, the generated execution plans (execution routes) are the following six plans.

Execution plan 1: node T2→node T1→node K→node C
Execution plan 2: node T2→node K→node T1→node C
Execution plan 3: node T1→node T2→node K→node C
Execution plan 4: node T1→node K→node T2→node C
Execution plan 5: node K→node T1→node T2→node C
Execution plan 6: node K→node T2→node T1→node C Note that in one route (for example, node K→node T2) encompasses a plurality of transfer methods (a direct transfer, and diverted transfers). However, an execution plan only including the direct transfer is generated here.

Figure 9:
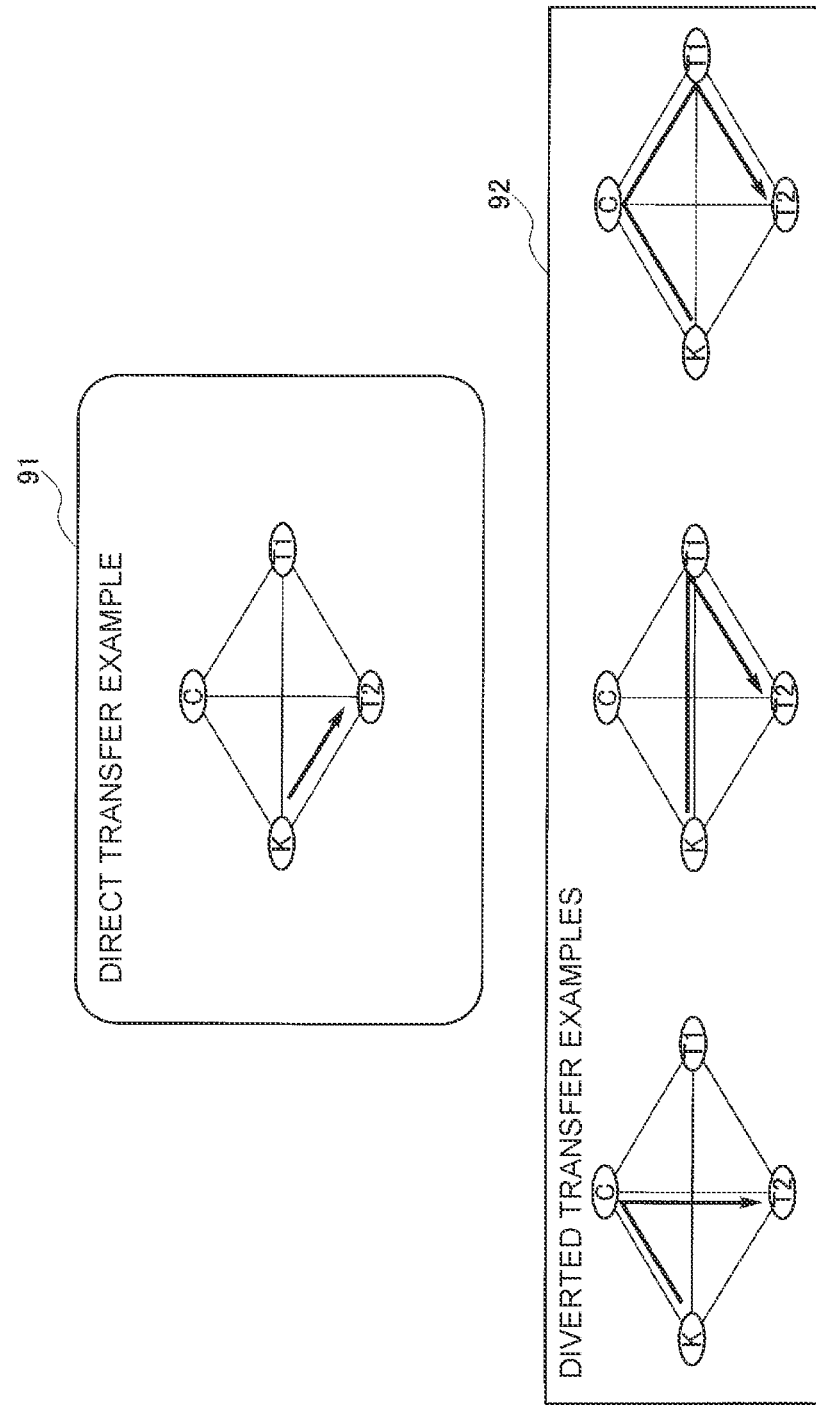
FIG. 9 is a diagram for explaining direct transfer and diverted transfer.

FIG. 9 is a diagram for explaining the direct transfer and the diverted transfers. The diverted transfers are transfer methods other than the direct transfer. FIG. 9 shows transfer methods from the node K to the node T2 in the network configuration shown in FIG. 6. A direct transfer 91 directly transfers data from K to T2. Diverted transfers 92 indicate three diverted transfers that are node K→node C→node T2 via C, node K→node T1→node T2 via node T1, and node K→node C→node T1→node T2 via nodes C and T1.

Figure 10:
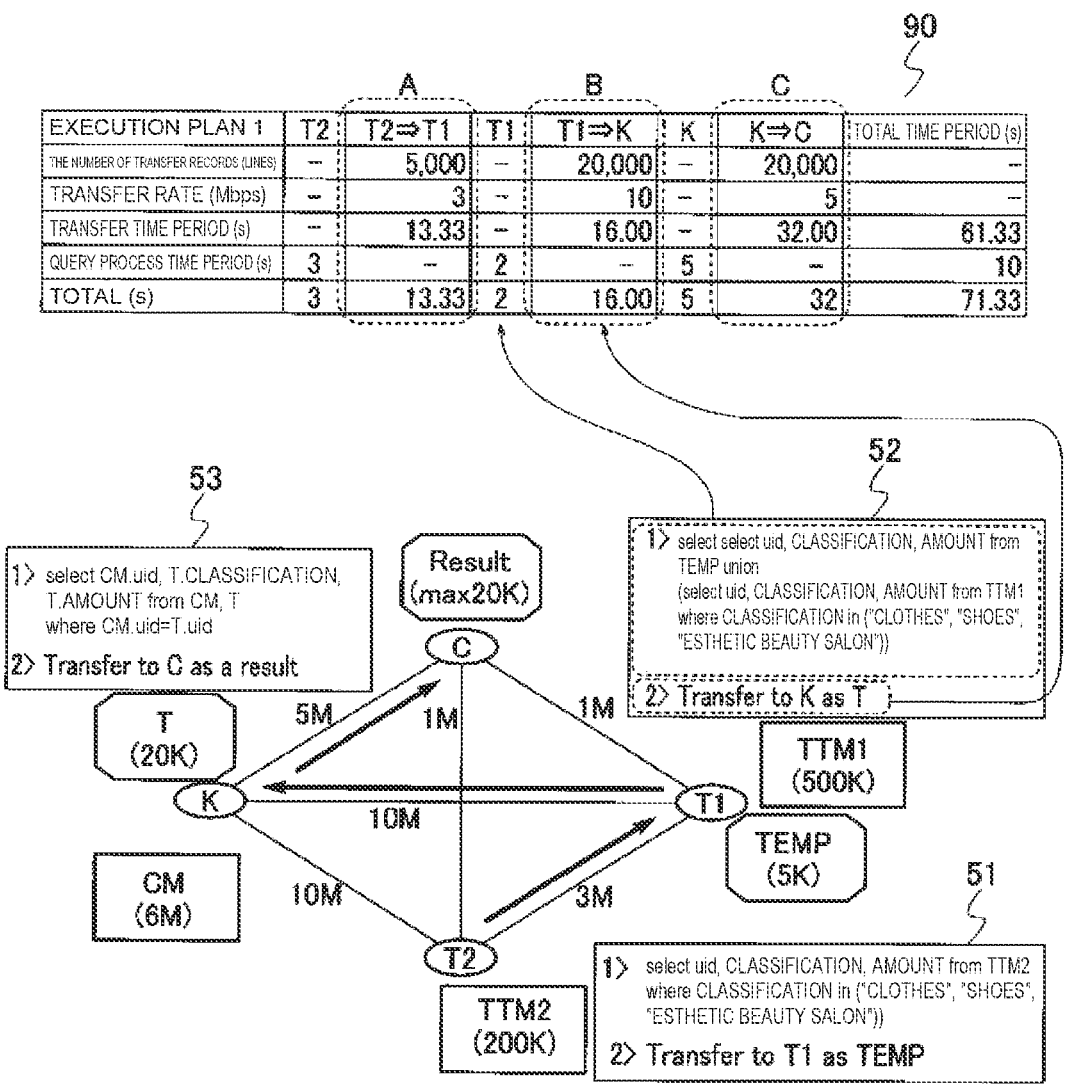
FIG. 10 is a diagram for explaining an execution cost of an execution plan.

FIG. 10 is a diagram for explaining calculation of the execution cost of the execution plan 1. According to the execution plan 1, first, the node T2 executes a divided query included in an instruction 51 for the node T2 onto the table TTM2, and transmits TEMP that is an execution result to the node T1. The node T1 executes a divided query included in an instruction 52 for the node T1 onto the tables TTM1 and TEMP, and transmits T that is an execution result to the node K. The node K executes a divided query included in an instruction 53 for the node K onto the tables CM and T, and transmits Result that is the final execution result to the node C (distributed processing apparatus 1).

An execution cost table 90 shown in FIG. 10 displays the total of the query process time periods of the nodes (T1, T2, and K) calculated by the distributed processing apparatus 1 and the data transfer time periods of the execution results to other nodes, as the execution cost (execution time period). The query process time periods are calculated using the data sizes of the intended tables. The data transfer time periods are calculated using the number of transfer records and the transfer rates. The distributed processing apparatus 1 estimates the number of transfer records of each node using a function of optimizing the query. In FIG. 10, the total time period of the data transfer time periods and the query process time periods is regarded as the execution cost. Alternatively, without consideration of the query process time periods, only the data transfer time periods that account for a large proportion may be adopted as the execution cost.

FIG. 11 shows the execution cost (execution time period) of each execution plan in the case of only using the data transfer time period. In this case, the distributed processing apparatus 1 selects the execution plan 1 having the minimum execution cost (61.33) (S15).

The distributed processing apparatus 1 divides the input query in accordance with the selected execution plan 1, and generates divided queries for the individual nodes. The distributed processing apparatus 1 then generates instructions that include divided queries, and transfer destinations of execution results of the divided queries for each of the nodes T1, T2, and K (DB apparatuses 2), and transmits the instructions corresponding to the individual nodes (S16). FIG. 10 shows examples 51 to 53 of the instructions described above. The divided queries are obtained by dividing the input query into execution items in the individual nodes. The individual nodes execute the divided queries in accordance with the instructions, and transfer execution results to the transfer destinations in the instructions (S17).

FIG. 12 shows the process in the node T2. According to the execution plan 1, first, the node T2 executes the divided query in the instruction 51 onto the own table TTM2, and transfers the execution result as TEMP to the node T1 in the instruction. Here, the node T2 extracts records having classifications of "CLOTHES", "SHOES" and "ESTHETIC BEAUTY SALON" from the table TTM2, and transfers the extracted records as TEMP to the node T1.

Figure 13:
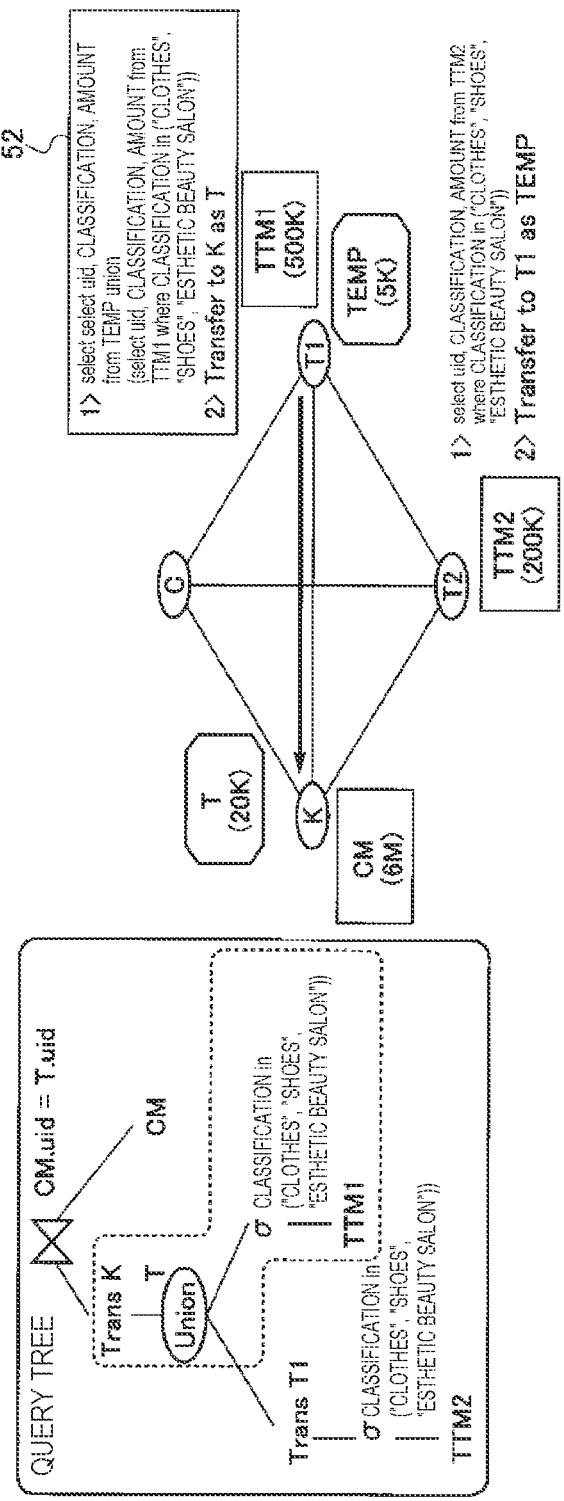
FIG. 13 schematically shows a process of a node T1 of the execution plan 1.

FIG. 13 shows the process in the node T1. The node T1 executes the divided query in the instruction 52 onto TEMP (the execution result of the node T2) received from the node T2 and onto the own table TTM1, and transfers the execution result as T to the node K in the instruction. Here, the node T1 extracts records having classifications of "CLOTHES", "SHOES" and "ESTHETIC BEAUTY SALON" from the table TTM1, integrates the extracted records with TEMP, and transfers the integrated items as T to the node K.

Figure 14:
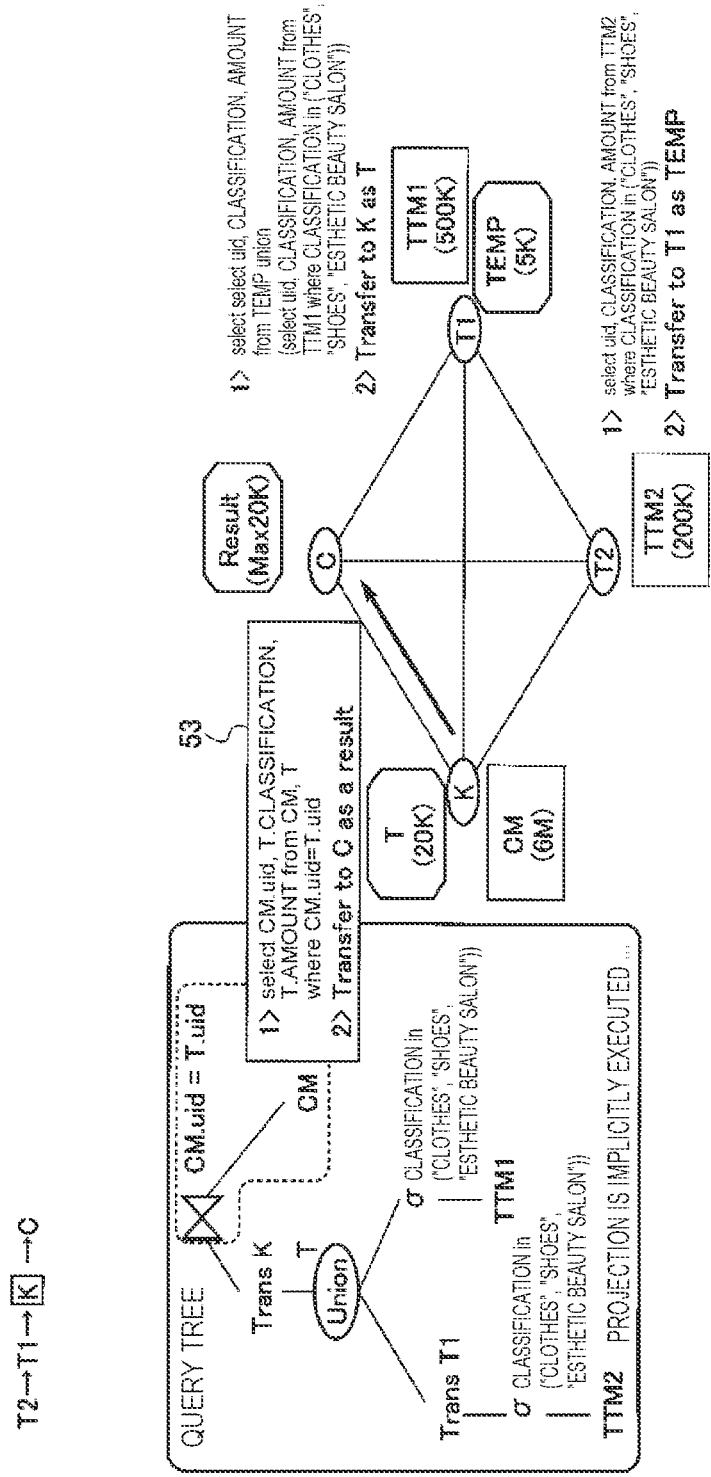
FIG. 14 schematically shows a process of a node K of the execution plan 1.

FIG. 14 shows the process in the node K. The node K executes the divided query in the instruction 53 onto T (the execution result of the node T1) received from the node T1 and onto the own table CM, and transfers the final execution result as Result to the node C in the instruction. Here, the node K transfers the records of purchase histories of "CLOTHES", "SHOES" and "ESTHETIC BEAUTY SALON" of each user of the department store, as Result, to the node C.

The distributed processing apparatus 1 (node C) receives the final execution result of the query 5 from the node K, and outputs the execution result (S18). The distributed processing apparatus 1 may visualize the received execution result using a visualization tool, such as Tableau, and output the visualized query result.

Modified Example 1

Next, Modified Example 1 of the present embodiment will be described. According to Modified Example 1, in a case of presence of policy enforcement, the distributed processing apparatus 1 excludes execution plans against the policy enforcement. The policy enforcement may be, for example, incapability of transferring data before query processing to another node. If such immobile data exists, the distributed processing apparatus 1 only transfers the execution result of the divided query with respect to this data, to the other node.

Figure 15:
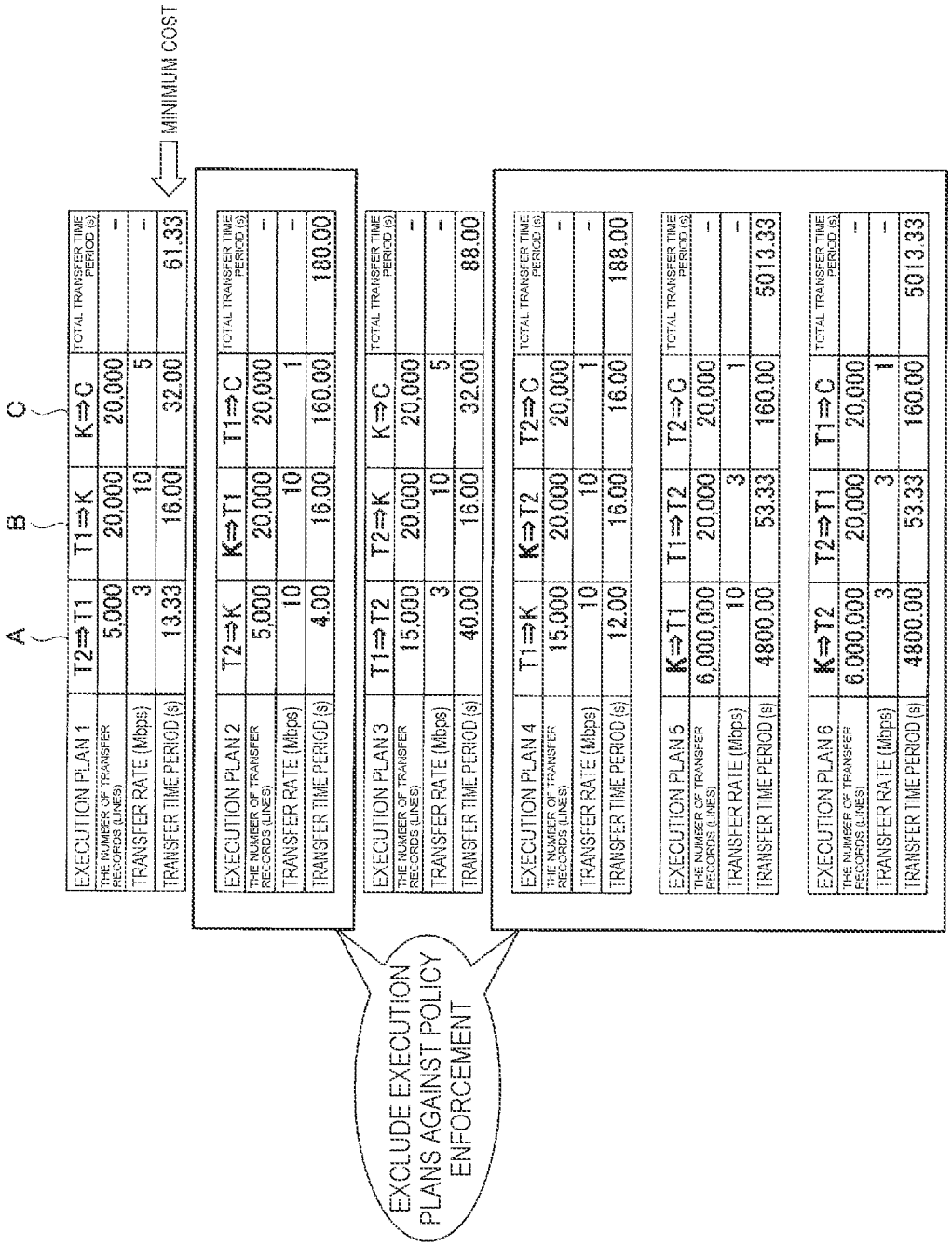
FIG. 15 shows an execution plan in a case of presence of policy enforcement of Modified Example 1.

FIG. 15 shows the execution plans in the case of presence of the policy enforcement prohibiting the table CM of the node K from being transferred. The distributed processing apparatus 1 (execution plan selection unit 12) determines that the execution plan where the node K is set as the transfer source in an A column in FIG. 15, and the execution plan where the node K is set as the transfer source in a B column are execution plans against the policy enforcement, and excludes these execution plans. Accordingly, in S14 in FIG. 5, the distributed processing apparatus 1 excludes the execution plans 2 and 4 to 6, lists only the execution plans 1 and 3, and selects the execution plan 1 having the minimum cost.

In the modified example 1, the query can be executed without transferring data before query execution in the predetermined node to other nodes. That is, in the present embodiment including this modified example, data items in the distributed DB are not necessarily aggregated in one site. Accordingly, even in the case of presence of the policy enforcement prohibiting classified data, such as personal information, from being transferred, the distributed query processing scheme of the present embodiment can be applied to the query related to the distributed DBs including data items prohibited from being transferred. Consequently, in the present embodiment, data items prohibited from being transferred to the outside can be analyzed.

Modified Example 2

Figure 16:
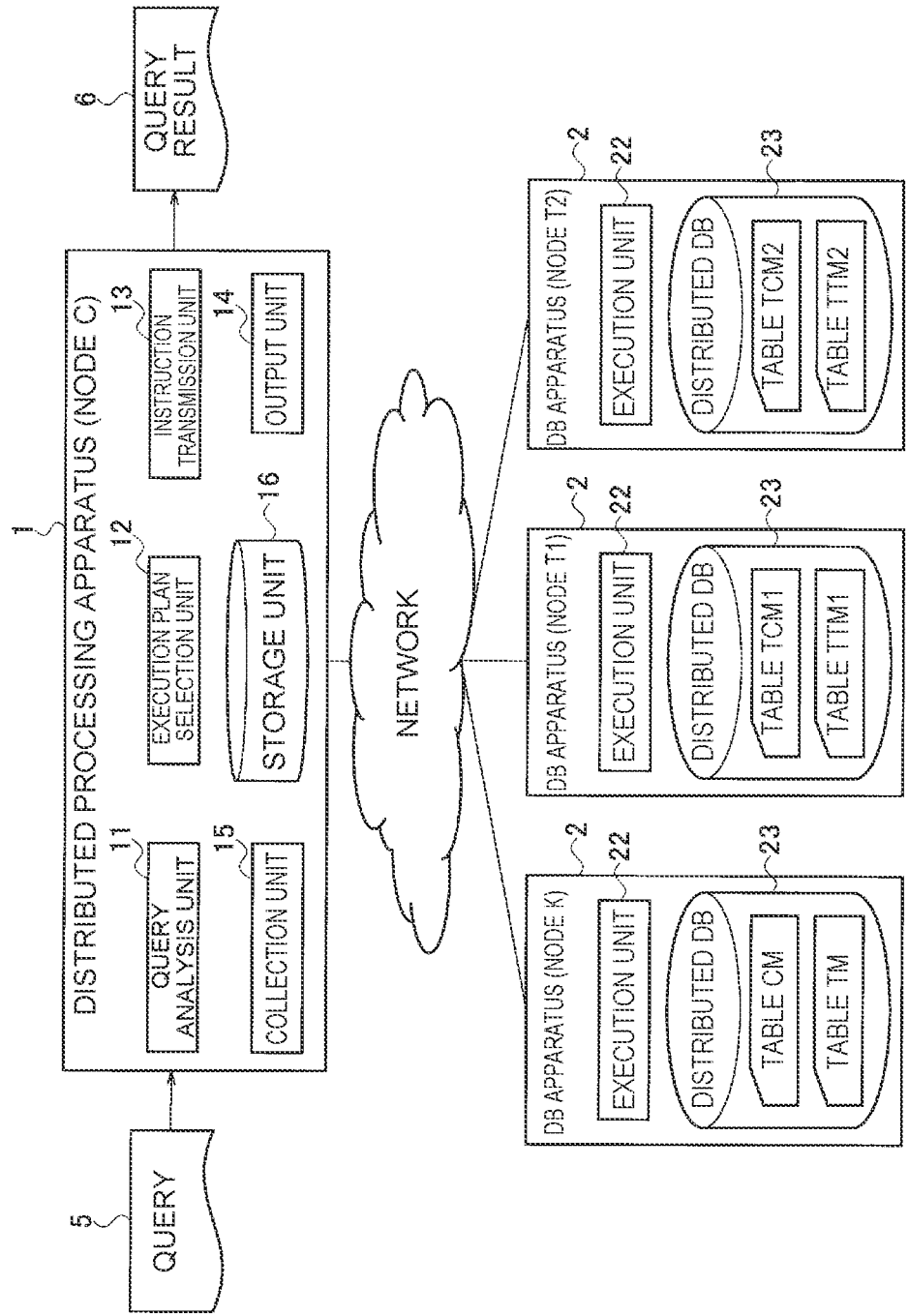
FIG. 16 shows a configuration example of a distributed database system of Modified Example 2.

FIG. 16 shows a configuration example of a distributed DB system of Modified Example 2 of the present embodiment. The distributed DB system of Modified Example 2 is different from the distributed DB system shown in FIG. 1 in that the distributed processing apparatus 1 does not include the collection unit 15 and the DB apparatuses 2 do not include the measurement units 21. In this case, the storage unit 16 of the distributed processing apparatus 1 stores preliminarily measured or designed network performance information between the nodes. As described above, the DB apparatuses 2 may include measurement units 21 or no measurement unit 21.

Effects of the Present Embodiment

In the distributed DB system of the present embodiment described above, the distributed processing apparatus 1 includes: the execution plan selection unit 12 that lists execution plans for a query related to a plurality of DB apparatuses 2, and selects any of the execution plans based on data transfer time periods of the individual execution plans; the instruction transmission unit 13 that divides the query in accordance with the selected execution plan, and transmits instructions that include divided queries obtained by dividing the query and transfer destinations of execution results of the divided queries to the corresponding DB apparatuses 2; and the output unit 14 that receives the execution result of the query from the DB apparatus 2, and outputs the execution result. The DB apparatuses 2 each include the execution unit 22 that executes the divided query included in the instruction received from the distributed processing apparatus 1, and transmits the execution result to another DB apparatus 2 or the distributed processing apparatus 1 serving as the transfer destination included in the instruction.

Accordingly, in the present embodiment, the query related to the plurality of DB apparatuses 2 can be processed without integrating, into a single apparatus, data items in the DB apparatuses 2 via the network. Consequently, in the present embodiment, loads can be prevented from being concentrated into a specific network, and the query can be efficiently executed. In the present embodiment, the data transfer time period and the data transfer cost can be reduced.

In the present embodiment, any of the execution plans is selected on the basis of the data transfer time periods of the listed execution plans. Accordingly, in the present embodiment, the optimal execution plan for the query can be selected in conformity with the network performance, and the execution cost of the query can be reduced.

In Modified Example 1 in the present embodiment, the distributed processing apparatus 1 excludes the execution plans against the policy enforcement from among the execution plans. In the present embodiment, the execution results are transmitted and received between the individual nodes and the query is executed without integrating the data items in the DB apparatuses 2 into a single apparatus. Accordingly, even in the case of presence of the policy enforcement prohibiting data from being transferred to the outside, the distributed query processing scheme of the present embodiment can be applied.

Comparative Example

Figure 17:
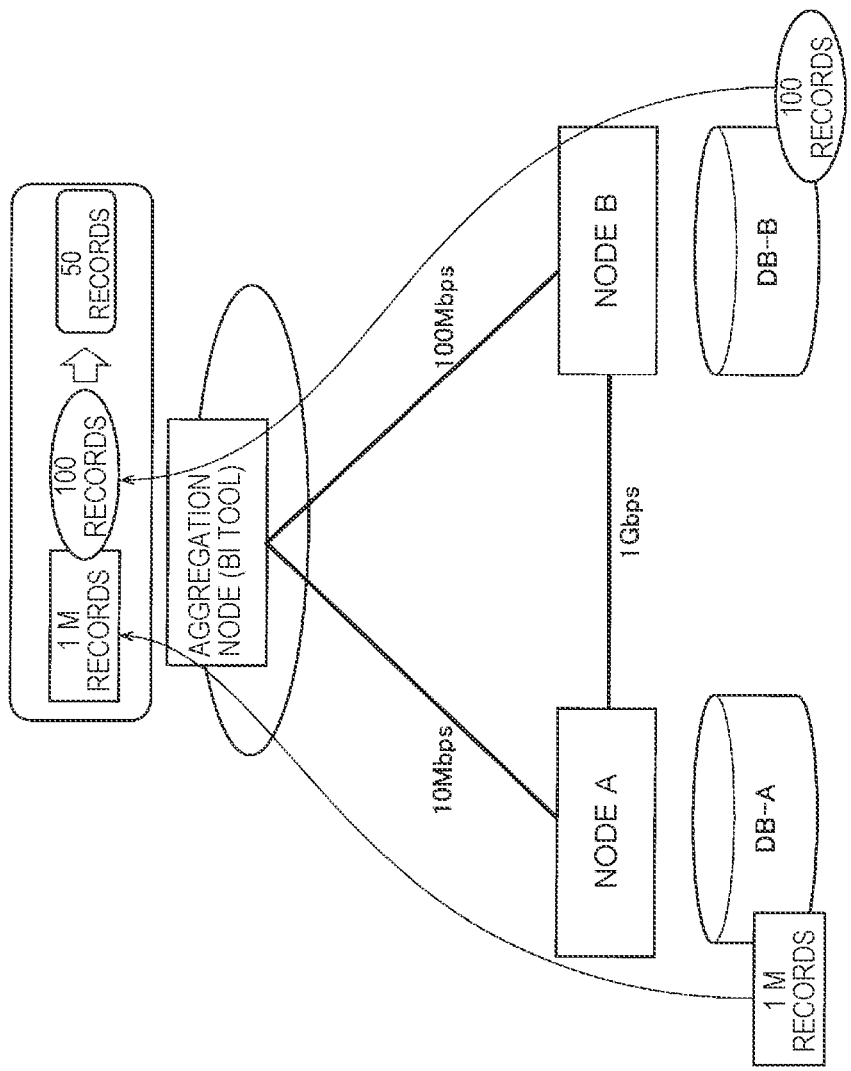
FIG. 17 is a diagram for explaining Comparative example 1 of the present embodiment.
Figure 18:
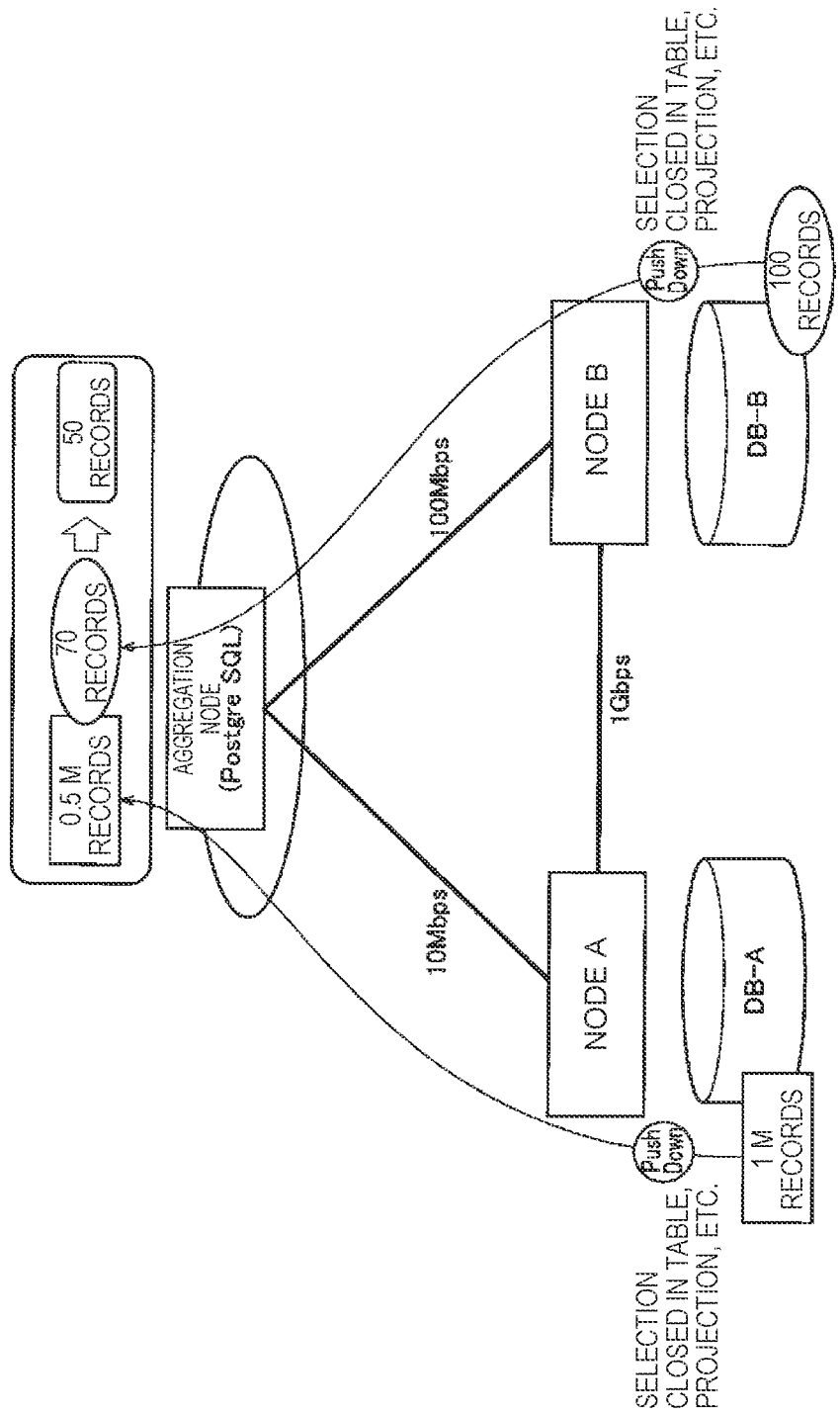
FIG. 18 is a diagram for explaining Comparative example 2 of the present embodiment.
Figure 19:
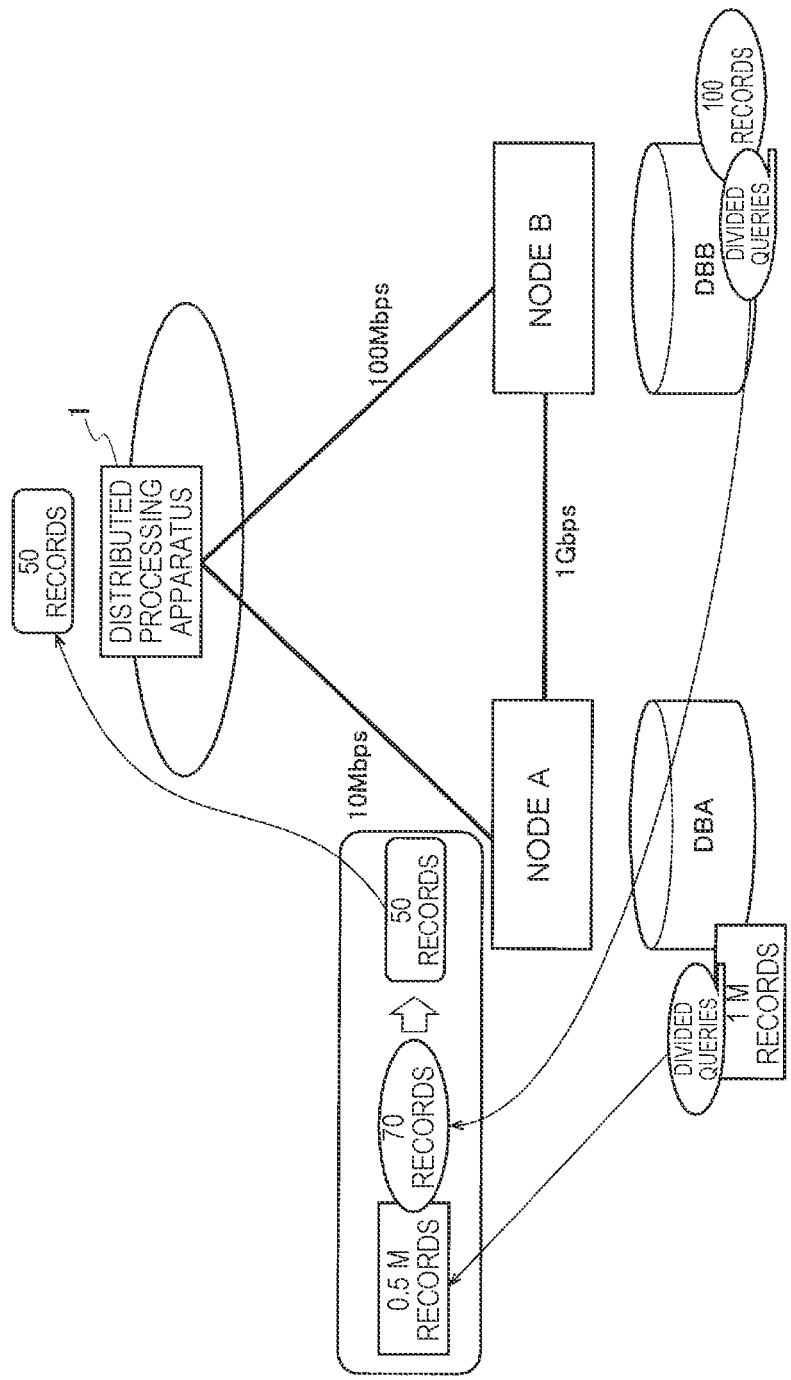
FIG. 19 is a diagram for explaining a scheme of the present embodiment.

FIGS. 17 and 18 are diagrams for explaining Comparative Examples 1 and 2 of the present embodiment. The distributed DB-A of the node A and distributed DB-B of the node B are each present on premise. The distributed DB-A includes one million records. The distributed DB-B includes a hundred records. Here, the operation in a case of execution of a query across the distributed DB-A and the distributed DB-B having about 50 records is described.

Comparative Example 1 shown in FIG. 17 is a comparative example using a BI (Business Intelligence) tool. In Comparative Example 1, each node transfers all the records in the distributed DB included in the corresponding node to an aggregation node, and the aggregation node executes the query onto the transferred records. In Comparative Example 1, data items are aggregated in the aggregation node at one site. Accordingly, the transfer data amount increases, and the data transfer time period and the transfer cost increase.

Comparative Example 2 shown in FIG. 18 is a scheme that pushes down an aggregation operation to the distributed DB-A of the node A and the distributed DB-B of the node B using Foreign Data Wrapper (FDW) of PostgreSQL. That is, in Comparative Example 2, a part of the query can be pushed down, and each node transfers, to the aggregation node, a data item on the result of the process performed on the own distributed DB. The aggregation node combines the data items transferred from the individual nodes.

Specifically, the node A reduces the number of records in the distributed DB-A to 500 thousands by means of the pushed down query process, and transfers the records to the aggregation node. Likewise, the node B reduces the number of records in the distributed DB-B to 70, and transfers the records to the aggregation node. The aggregation node combines the records transferred from the individual nodes, and obtains 50 records.

In Comparative Example 2, by pushing down a part of the query to the lower nodes, the data items to be transferred to the aggregation node can be filtered (reduced), and the data transfer time period can be compressed. However, while a filtering process that the distributed DB-A can perform solely by itself can be pushed down to the distributed DB-A, a filtering process that requires the data in the distributed DB-B may not be pushed down to the distributed DB-A. Accordingly, the effects of the filtering process by pushing down are limited. That is, in Comparative Example 2, data items to be processed are required to be aggregated in the aggregation node in order to combine the data items between the DBs. Accordingly, the loads are concentrated on a specific network.

On the other hand, according to the scheme of the present embodiment shown in FIG. 18, the optimal execution plan is selected in consideration of the network performances and the transfer data amounts between the nodes, the data items are transferred between the nodes, and only the final execution result is transmitted to the distributed processing apparatus 1. Accordingly, in the present embodiment, the data transfer time period can be compressed.

(Hardware Configurations of Distributed Processing Apparatus and DB Apparatuses)

Figure 20:
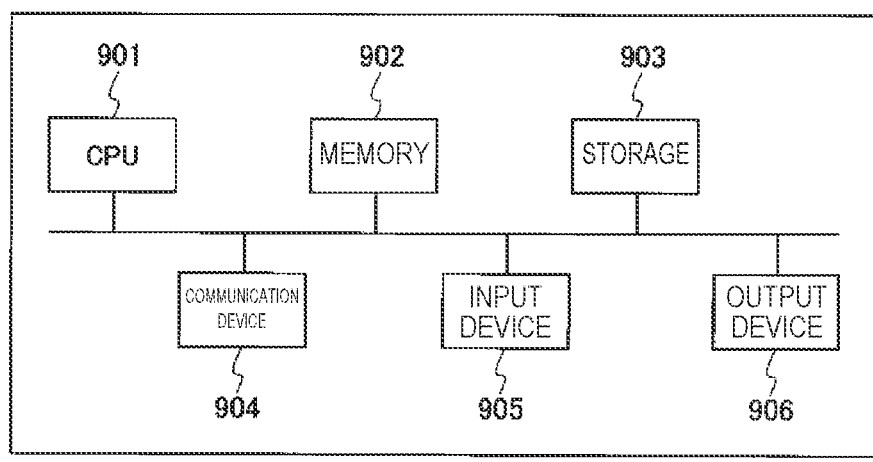
FIG. 20 shows a hardware configuration example of a distributed processing apparatus and DB apparatuses.

The distributed processing apparatus 1 and the DB apparatuses 2 described above may adopt, for example, a general-purpose computer system as shown in FIG. 20. The shown computer system includes a CPU (Central Processing Unit, processor) 901, a memory 902, a storage 903 (HDD: Hard Disk Drive, SSD: Solid State Drive), a communication device 904, an input device 905, and an output device 906. The memory 902 and the storage 903 are storage devices. In this computer system, the CPU 901 executes a predetermined program loaded on the memory 902, thereby achieving each function of each apparatus. For example, each of the functions of the distributed processing apparatus 1 and the DB apparatuses 2 is achieved through execution of a program by the CPU of the distributed processing apparatus 1 in the case of the program for the distributed processing apparatus 1, and through execution of a program by the CPU of the corresponding DB apparatus 2 in the case of the program for the DB apparatus 2.

The distributed processing apparatus 1 and the DB apparatuses 2 may be implemented in a single computer or in a plurality of computers. The distributed processing apparatus 1 and the DB apparatuses 2 may be virtual machines implemented in one or more computers.

The program for the distributed processing apparatus 1 and the programs for the DB apparatuses 2 may be stored in computer-readable recording media, such as HDDs, SSDs, USB (Universal Serial Bus) memories, CDs (Compact Discs) and DVDs (Digital Versatile Discs), or be distributed via a network.

Note that the present invention is not limited to the embodiment and modified examples described above, and can be variously modified in a range of the gist thereof.

REFERENCE SIGNS LIST

1 Distributed processing apparatus (node C)
11 Query analysis unit
12 Execution plan selection unit
13 Instruction transmission unit
14 Output unit
15 Collection unit
16 Storage unit
2 DB apparatus (nodes K, T1, and T2)
21 Measurement unit
22 Execution unit
23 Distributed DB
5 Query
6 Query result

The invention claimed is:

1. A database system comprising:
a distributed processing apparatus; and
a plurality of database apparatuses, wherein
the distributed processing apparatus comprises one or more first computers and one or more first storage devices storing first instructions that when executed by the one or more first computers, cause the one or more first computers to perform first operations comprising:
listing execution plans for a query related to the database apparatuses, obtaining information on network performances among the plurality of database apparatuses, computing data transfer time periods of the individual execution plans using the information on the network performances, and selecting any of the execution plans based on the data transfer time periods;
dividing the query in accordance with the selected execution plan, and transmitting instructions that include divided queries obtained by dividing the query and transfer destinations of execution results of the divided queries to the corresponding database apparatuses;
receiving the execution result of the query from the database apparatus, and outputting the execution result;
wherein selecting the execution plans based on the data transfer time periods comprises selecting any of the execution plans from among the execution plans excluding execution plans which transfer, to other database apparatuses, data prohibited from being transferred to the other database apparatuses, and
the database apparatuses each comprise one or more second computers and one or more second storage devices storing second instructions that when executed by the one or more second computers, cause the one or more second computers to perform second operations comprising:
executing the divided query included in the instruction received from the distributed processing apparatus, and transmitting the execution result to another database apparatus or the distributed processing apparatus serving as the transfer destination included in the instruction,
wherein the another database apparatus serving as the transfer destination included in the instruction is a database apparatus that executes the divided query next.

2. The database system according to claim 1, wherein
for each of the database apparatuses, the second operations further comprise measuring a network performance between the database apparatus itself and the other database apparatus or the distributed processing apparatus, and transmitting measured performance information to the distributed processing apparatus.

3. A distributed processing apparatus, comprising one or more first computers and one or more first storage devices storing first instructions that when executed by the one or more first computers, cause the one or more first computers to perform first operations comprising:
listing execution plans for a query related to a plurality of database apparatuses, obtaining information on network performances among the plurality of database apparatuses, computing data transfer time periods of the individual execution plans using the information on the network performances, and selecting any of the execution plans based on data transfer time periods of the individual execution plans;
dividing the query in accordance with the selected execution plan and transmits instructions that include divided queries obtained by dividing the query and transfer destinations of execution results of the divided queries to the corresponding database apparatuses; and
receiving the execution result of the query from the database apparatus, and outputting the execution result,
wherein selecting execution plans based on data transfer time periods of the individual execution plans comprises selecting any of the execution plans from among the execution plans excluding execution plans which transfer, to other database apparatuses, data prohibited from being transferred to the other database apparatuses.

4. A distributed processing method of a database system that comprises a distributed processing apparatus and a plurality of database apparatuses,
wherein the distributed processing apparatus performs:
listing execution plans for a query related to the database apparatuses, obtaining information on network performances among the plurality of database apparatuses, computing data transfer time periods of the individual execution plans using the information on the network performances, and selecting any of the execution plans based on data transfer time periods of the individual execution plans;
dividing the query in accordance with the selected execution plan, and transmitting instructions that include divided queries obtained by dividing the query and transfer destinations of execution results of the divided queries to the corresponding database apparatuses; and
receiving the execution result of the query from the database apparatus, and outputting the execution result,
wherein selecting execution plans based on data transfer time periods of the individual execution plans comprises selecting any of the execution plans from among the execution plans excluding execution plans which transfer, to other database apparatuses, data prohibited from being transferred to the other database apparatuses, and
the database apparatuses each perform
executing the divided query included in the instruction received from the distributed processing apparatus, and transmitting the execution result to another database apparatus or the distributed processing apparatus serving as the transfer destination included in the instruction;

wherein the another database apparatus serving as the transfer destination included in the instruction is a database apparatus that executes the divided query next.

5. A computer-readable storage medium storing a distributed processing program for causing a computer to function as the distributed processing apparatus according to claim 3.

\* \* \* \* \*